United States Patent
Li et al.

(10) Patent No.: US 8,489,650 B2
(45) Date of Patent: Jul. 16, 2013

(54) SYSTEM, IMPLEMENTATION, APPLICATION, AND QUERY LANGUAGE FOR A TETRAHEDRAL DATA MODEL FOR UNSTRUCTURED DATA

(75) Inventors: Xiaogeng Li, Beijing (CN); Wei Li, Beijing (CN); Bo Lang, Beijing (CN)

(73) Assignee: Beijing Uniwtech Co., Ltd., Beijing (CN)

( * ) Notice: Subject to any disclaimer, the term of this patent is extended or adjusted under 35 U.S.C. 154(b) by 266 days.

(21) Appl. No.: 12/984,967

(22) Filed: Jan. 5, 2011

(65) Prior Publication Data
US 2012/0173590 A1    Jul. 5, 2012

(51) Int. Cl.
G06F 17/30    (2006.01)
(52) U.S. Cl.
USPC .......................................................... 707/811
(58) Field of Classification Search
None
See application file for complete search history.

(56) References Cited

U.S. PATENT DOCUMENTS

| | | | |
|---|---|---|---|
| 5,557,785 A | 9/1996 | Lacquit et al. | |
| 6,505,205 B1 * | 1/2003 | Kothuri et al. | 1/1 |
| 6,594,672 B1 * | 7/2003 | Lampson et al. | 1/1 |
| 7,181,450 B2 * | 2/2007 | Malloy et al. | 1/1 |
| 7,558,778 B2 * | 7/2009 | Carus et al. | 1/1 |
| 7,627,810 B2 | 12/2009 | Glazer et al. | |
| 7,774,695 B2 * | 8/2010 | Kobylinski | 715/227 |
| 7,805,463 B2 * | 9/2010 | Bevan et al. | 707/803 |
| 7,835,044 B2 * | 11/2010 | Brito et al. | 358/518 |
| 7,893,940 B2 * | 2/2011 | Mitchell et al. | 345/424 |
| 8,086,592 B2 * | 12/2011 | Mion et al. | 707/711 |
| 8,290,968 B2 * | 10/2012 | Jonas | 707/756 |
| 2004/0122844 A1 * | 6/2004 | Malloy et al. | 707/102 |
| 2005/0198073 A1 * | 9/2005 | Becks et al. | 707/104.1 |
| 2007/0214164 A1 * | 9/2007 | MacLennan et al. | 707/101 |
| 2007/0239792 A1 * | 10/2007 | Chen et al. | 707/200 |
| 2007/0244859 A1 * | 10/2007 | Trippe et al. | 707/3 |
| 2007/0266308 A1 * | 11/2007 | Kobylinski | 715/509 |
| 2007/0299855 A1 * | 12/2007 | Levin | 707/101 |
| 2009/0024660 A1 * | 1/2009 | Borgsmidt et al. | 707/104.1 |
| 2009/0144295 A1 * | 6/2009 | Mion et al. | 707/100 |
| 2009/0198643 A1 * | 8/2009 | Cypher et al. | 707/2 |
| 2009/0228428 A1 | 9/2009 | Dan et al. | |

(Continued)

OTHER PUBLICATIONS

Amato G, Mainetto G, Savino P. An approach to a content-based retrieval of multimedia data. Multimed Tools Appl, 1998, 7: 9-36.*

(Continued)

Primary Examiner — Fred I Ehichioya
Assistant Examiner — Richard Bowen
(74) Attorney, Agent, or Firm — Fenwick & West LLP

(57) ABSTRACT

Systems, implementations, applications, and a query language for a tetrahedral data model for unstructured data are disclosed. The tetrahedral data model includes a vertex, four facets, and lines between the facets. The vertex represents a unique identifier for the underlying unstructured data. The four facets represent basic attributes, semantic features, low-level features, and raw data. The lines represent relationships between connected elements. The tetrahedral data model is implemented in the logical schema in an Unstructured data Base Management System (UDBMS), which stores the basic attributes and the semantic features in XML files, stores the low-level features and the raw data using a three-dimensional big table, and stores the associations in an adjacency matrix. A tetrahedral annotation module creating and populating tetrahedrons can be integrated into unstructured data processing apparatuses. An unstructured data query language provides comprehensive query operations for unstructured data represented by the tetrahedral data model in an UDBMS.

20 Claims, 6 Drawing Sheets

U.S. PATENT DOCUMENTS

| | | | |
|---|---|---|---|
| 2009/0327230 A1 | 12/2009 | Levin et al. | |
| 2010/0121841 A1* | 5/2010 | He et al. | 707/722 |
| 2011/0029533 A1* | 2/2011 | Jayakody et al. | 707/738 |
| 2011/0116135 A1* | 5/2011 | Ernst et al. | 358/3.06 |
| 2011/0252031 A1* | 10/2011 | Blumenthal et al. | 707/733 |
| 2012/0072435 A1* | 3/2012 | Han | 707/754 |

OTHER PUBLICATIONS

M. Campbell, A. Haubold, S. Ebadollahi, D. Joshi, M. R. Naphade, A. P. Natsev, J. Seidl, J. R. Smith, K. Scheinberg, J. Tešic, and L. Xie, "IBM research TRECVID-2006 video retrieval system," in Proceedings of the TRECVID Workshop, Gaithersburg, USA, 2006.*

OASIS, "Unstructured Information Management Architecture (UIMA) Version 1.0," Working Draft 05, May 2008.*

Annamalai, M., et al., "Oracle Multimedia: Managing Multimedia Content," An Oracle White Paper, Sep. 2009, pp. 1-13.

Hjelsvold, R., et al., "Modelling and Querying Video Data," Proceedings of the 20$^{th}$ International Conference on Very Large Data Bases (VLDB), Santiago, Chile, 1994, pp. 686-694.

Ishikawa, H., et al., "The Model, Language, and Implementation of an Object-Oriented Multimedia Knowledge Base Management System," Fujitsu Laboratories Ltd., ACM Transactions on Database Systems, Mar. 1993, vol. 18, No. 1, pp. 1-50.

Jianfeng, Y., et al., "A Novel Multimedia Data Model Supporting Temporal Semantic Abstraction," Proceedings of the Third International Conference on Information Systems Technology and its Applications (ISTA), 2004, vol. 48, pp. 241-246.

Li, W., et al., "A tetrahedral data model for unstructured data management," Science China Information Sciences, Aug. 2010, pp. 1497-1510, vol. 53, No. 8.

Maletic, J. I., et al., "Adding Structure to Unstructured Text," Wright Center for Innovation/LexisNexis Conference on Using Metadata to Manage Unstructured Text, 2005, pp. 1-5.

McHugh, J., et al., "Lore: A Database Management System for Semistructured Data," SIGMOD Record, 1997, vol. 26, No. 3, pp. 54-66.

Schloss, G. A., et al., "Using a Layered Paradigm to Model Multimedia," Proceedings of the 28$^{th}$ Annual Hawaii International Conference on System Sciences, 1995, pp. 777-786.

* cited by examiner

BAF: Basic Attribute Facet
SFF: Semantic Feature Facet
LFF: Low-level Feature Facet
RDF: Raw Data Facet

SYSTEM, IMPLEMENTATION, APPLICATION, AND QUERY LANGUAGE FOR A TETRAHEDRAL DATA MODEL FOR UNSTRUCTURED DATA

BACKGROUND

1. Field of Disclosure

The disclosure generally relates to the field of digital content, in particular to representation of unstructured data.

2. Description of the Related Art

With the rapid development of information technology, the quantity of unstructured data has increased dramatically. Now unstructured data accounts for a majority of the total data in the world. Unstructured data (also called unstructured information) refers to data with no uniform structure. Examples of unstructured data include text, graphic, image, audio, and video data. Unlike structured data, which is described by explicit semantic data models, unstructured data lacks such explicit semantic structure necessary for computerized interpretation. See OASIS, "Unstructured Information Management Architecture (UIMA) Version 1.0", Working Draft 05, May 2008, the content of which is incorporated by reference in its entirety. As a result, unstructured data often need manual or automated annotations in order to be properly interpreted and/or processed by computer applications/devices.

Various content management systems and database management systems have been developed to manage unstructured data. However, because the data models used by these systems describe the unstructured data either by descriptive text or by low-level features, these systems can only provide limited data retrieval methods and do not have the capacity to support intelligent data services (e.g., retrieval based on multiple retrieval methods, data analysis, data mining) that are often necessary for managing and manipulating large amounts of unstructured data.

Accordingly, there is a need for a data model that can provide an integral representation of textual description and features of different kinds of unstructured data, and systems and applications utilizing the data model to provide effective and intelligent data operations on the unstructured data.

SUMMARY

Embodiments of the present disclosure include systems, implementations, applications, and a query language for a tetrahedral data model for unstructured data.

One aspect of the present disclosure is a tetrahedral data model for unstructured data. An instance of the tetrahedral data model, also called a tetrahedron, includes a vertex, four facets, and lines between the facets. The vertex represents a unique identifier for the underlying unstructured data. The four facets represent four aspects of the underlying unstructured data: basic attributes, semantic features, low-level features, and raw data. The lines connecting facets represent relationships between connected elements of different facets.

Another aspect of the present disclosure is an implementation of the tetrahedral data model in an Unstructured data Base Management System (UDBMS). The UDBMS generates the vertexes, and stores the basic attributes and the semantic features in Extensible Markup Language (XML) files. The low-level features and the raw data are organized and stored using a three-dimensional ("3D") big table that is extendable at runtime. The associations between elements on different facets are stored in an adjacency matrix.

A third aspect of the present disclosure is a tetrahedral annotation module (and corresponding process and computer program product) for representing unstructured data using a tetrahedral data model. The tetrahedral annotation module can be integrated into unstructured data processing apparatuses, such as a digital camera, a digital audio recorder, a digital video recorder, an audio/video (A/V) data generating device, and a document/video/audio/image/graphic editing application. The tetrahedral annotation module creates tetrahedrons for unstructured data generated by the apparatus and populates the tetrahedrons using information related to the unstructured data.

A fourth aspect of the present disclosure is an unstructured data query language (UDQL) developed to provide comprehensive query operations for unstructured data represented by the tetrahedral data model in an UDBMS. Example query operations for unstructured data supported by the UDQL include: basic data retrieval (e.g., queries on a single facet of the tetrahedron), associated retrieval (e.g., queries that use two or three facets of a tetrahedron, queries among multiple tetrahedrons), and intelligent retrieval (e.g., queries that implement subject-oriented multidimensional data analysis, data clustering and classification according to specified conditions). The UDQL also supports more complex queries by supporting a nested structure based on these three different kinds of query operations.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Tetrahedral Data Model

Figure 1:
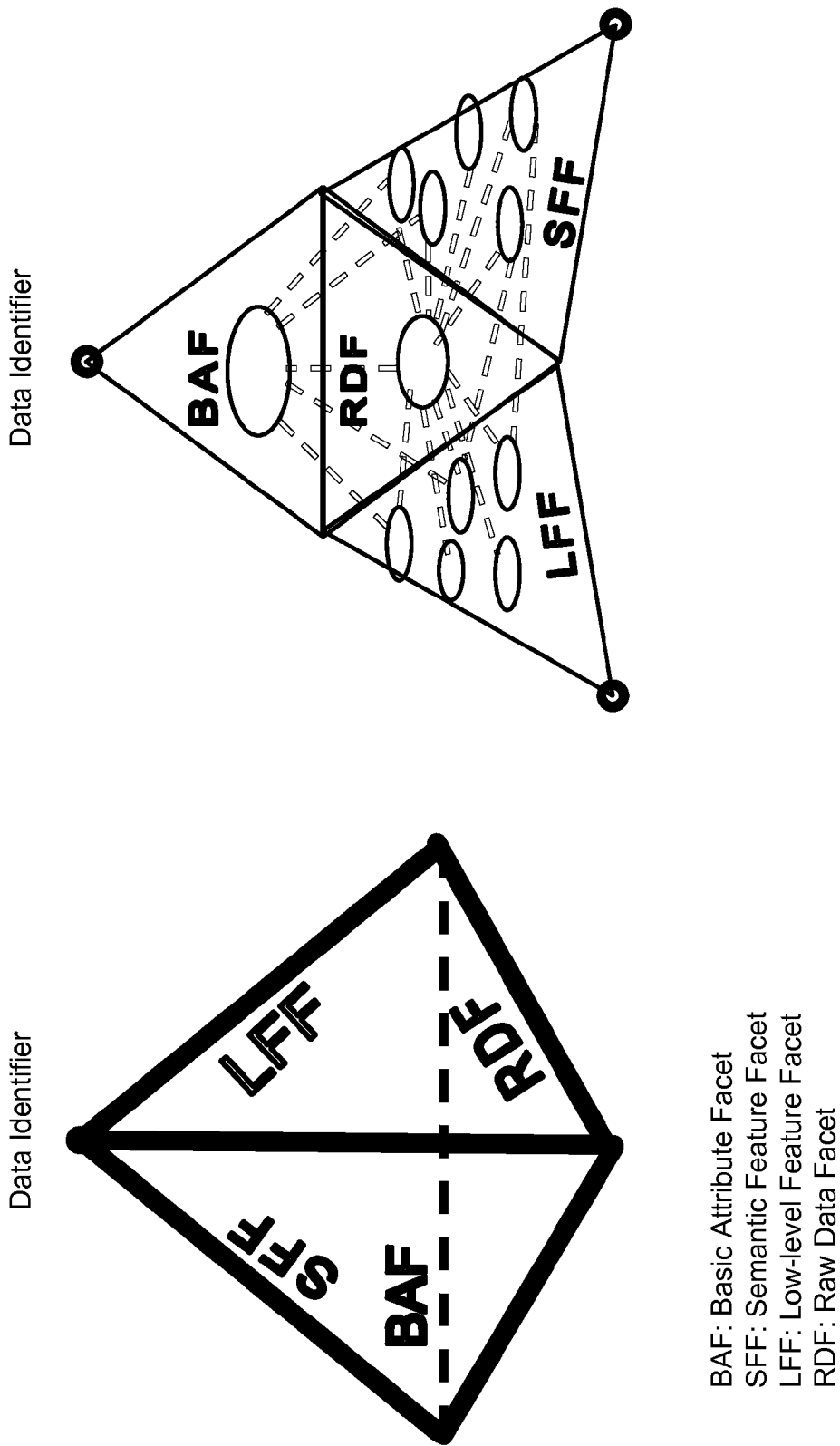
FIG. 1 is a diagram of a visual representation of a tetrahedral data model for unstructured data according to one embodiment of the present disclosure.

FIG. 1 includes a visual representation of a tetrahedral data model for unstructured data, according to one embodiment of the present disclosure. As shown, an instance of a tetrahedral data model, also called a tetrahedron, is composed of a vertex, four facets, and lines between the facets. The vertex, denoted by V, represents a unique identifier for the underlying unstructured data. The four facets represent four aspects of the underlying unstructured data: basic attributes, semantic features, low-level features, and raw data. Specifically, the bottom facet (opposing to the vertex) represents the raw data and is called the raw data facet (or "RDF"), and the three side facets (adjacent to the vertex) represent the basic attributes, the semantic features, and the low-level features separately, and are called the basic attribute facet ("BAF"), the semantic feature facet ("SFF"), and the low-level feature facet ("LFF"), respectively. The lines connecting facets represent relationships between connected elements of different facets.

Basic attributes refer to attributes that are universal to all kinds of unstructured data, such as name, type, author, and time of creation. Basic attributes do not include the semantics of the data. A basic attribute set is represented by points (also called "elements") on the basic attribute facet, and can be expressed by the following 4-tuple:

$$\text{BASIC\_ATTRIBUTE}(V, BA\_id, BA\_set, BA\_content), \quad (1)$$

where V denotes the identifier of the tetrahedron that this basic attribute set belongs to, BA_id denotes the identifier of the basic attribute set, BA_set denotes the set of basic attribute items (e.g., type, author, and date of creation), and BA_content denotes the values of the items in BA_set.

Semantic features refer to semantic properties expressed as text, such as the intention of the author, the subject, descriptions of content and objects of the unstructured data, the meaning of low-level features, annotations in keywords or free text styles, and concepts of data objects described using ontology. A semantic feature is represented by a point on the semantic feature facet, and can be expressed by the following 6-tuple:

$$\text{SEMANTIC\_FEATURE}(V, SF\_id, SF\_class, SF\_name, SF\_keyword, SF\_content), \quad (2)$$

where V denotes the identifier of the tetrahedron that contains this semantic feature, SF_id denotes the identifier of the semantic feature, SF_class denotes the type of the semantic feature (e.g., audio feature, video feature), SF_name denotes the name of the semantic feature (e.g., subject, intention of the author, plot, and textual description of key frames), SF_keyword denotes a collection of one or more keywords of the semantic feature, and SF_content denotes content of the semantic feature (e.g., a passage of illustrative or descriptive text).

Low-level features (also called "sense features") refer to properties that are specific to one or a few kinds of unstructured data acquired by using appropriate feature extraction techniques, such as color, texture, and shape for images, audio frequency pitch for audios, and key frame for videos. A low-level feature is represented by a point on the low-level feature facet and can be expressed by the following 6-tuple:

$$\text{LOW\_LEVEL\_FEATURE}(V, LF\_id, LF\_class, LF\_name, LF\_rep\_type, LF\_id\_content), \quad (3)$$

where V denotes the identifier of the tetrahedron that contains this low-level feature, LF_id denotes the identifier of the low-level feature, LF_class denotes the type of the data that the low-level feature describes, and $LF\_class \in \{\text{text, image, video, audio, graphics}\}$, LF_name denotes the name of the low-level feature (e.g., color, texture, shape, audio frequency, key frame), LF_rep_type denotes the data structure of the low-level feature (e.g., histogram for color, co-occurrence matrix for texture, Fourier descriptor for shape), LF_id_content denotes the value of the low-level feature.

Raw data refer to the stored file(s) of the underlying unstructured data. One piece of video, audio, or image data may contain several storage files (also called "raw data files", "data objects"), and each file is represented by one point on the raw data facet. A raw data file can be expressed by the following 4-tuple:

$$\text{DATA}(V, DATA\_id, DATA\_File\_id, DATA\_File\_name), \quad (4)$$

where V denotes the identifier of the tetrahedron that contains the raw data facet, DATA_id denotes the identifier of the data file set of the raw data, DATA_File_id denotes the identifier of a data file in the data file set, and DATA_File_name denotes the name of the data file.

A tetrahedron can be described using the following 6-tuple:

$$\text{Tetrahedron} = (V, BA\_FACET, SF\_FACET, LF\_FACET, RD\_FACET, CONJS), \quad (5)$$

where V denotes the identifier of the tetrahedron that the association belongs to, BA_FACET denotes the basic attribute facet and includes a set of basic attributes of the unstructured data, SF_FACET denotes the semantic feature facet and includes a set of textual semantic information, LF_FACET denotes the low-level feature facet and includes a set of features that is obtained from the unstructured data using multimedia feature extraction techniques, RD_FACET denotes the raw data facet and includes a set of raw data files, and CONJS denotes a collection of all the lines connecting objects on different facets representing associations between the connected objects. BA_FACET, SF_FACET, LF_FACET, RD_FACET, and CONJS are further described using the following equations:

$$\text{BA\_FACET} = \{\text{Basic\_Attribute}\}, \quad (6)$$

$$\text{SF\_FACET} = \{\text{Semantic\_Feature}_j | j \in [1, m]\}, \quad (7)$$

where m is a positive integer indicating the total number of the semantic features, $$\text{LF\_FACET} = \{\text{Low\_Level\_Feature}_k | k \in [1, n]\}, \quad (8)$$

where n is a positive integer indicating the total number of the low-level features, $$\text{RD\_FACET} = \{\text{Data}_l | l \in [1, p]\}, \quad (9)$$

where p is a positive integer indicating the total number of data files, and $$\text{CONJS} = \{BA\_FACET \times SF\_FACET \cup BA\_FACET \times LF\_FACET \cup BA\_FACET \times RD\_FACET \cup SF\_FACET \times LF\_FACET \cup SF\_FACET \times RD\_FACET \cup LF\_FACET \times RD\_FACET\}, \quad (10)$$

indicating that CONJS includes associations of elements from different facets.

Relationships (also called "associations") often exist among the basic attributes, semantic features, low-level features, and raw data files (collectively called "objects") represented by points on the four facets. For example, low-level features and their semantic descriptions are related. Such relationships are visually represented as lines connecting the related objects in different facets and collectively referred to as CONJS in Equation 5 and defined in Equation 10. An association between two objects within one tetrahedron can be expressed by the following 3-tuple:

$$\text{ASSOCIATION}(V, \text{Object}_1\_\text{id}, \text{Object}_2\_\text{id}), \quad (11)$$

where V denotes the identifier of the tetrahedron that the association belongs to, and $\text{Object}_1\_\text{id}$ and $\text{Object}_2\_\text{id}$ denote identifiers of the two objects being connected, $\text{Object}_1$ and $\text{Object}_2$, respectively, $\text{Object}_1$, $\text{Object}_2 \in \{\text{BA\_FACET} \vee \text{SF\_FACET} \vee \text{LF\_FACET} \vee \text{RD\_FACET}\}$, and $\text{Object}_1$, $\text{Object}_2$ belong to different facet.

The relationship can also be between different tetrahedrons. For example, tetrahedrons of different unstructured data having the same subject are related to each other. The associations between multiple tetrahedrons can be established by using the identifiers of these tetrahedrons. The association of k tetrahedrons can be expressed by the following binary tuple:

$$\text{ASSOCIATION\_OF\_TETRAHEDRONS(Subject,} \\ \{V_u | u \in [1, w]\}), \quad (12)$$

where Subject denotes the description of a subject, and $\{V_u | u \in [1,w]\}$ is the set of w tetrahedrons that related to one subject.

The associations can support associated retrieval involving multiple facets of one or multiple tetrahedrons. Associated retrieval can be implemented based on the associations within a tetrahedron or between multiple tetrahedrons. For example, retrievals following the associations among basic attributes, semantic features, and low-level features can rapidly narrow down the search scope, and find matching unstructured data more efficiently and accurately. In addition, the association of multiple tetrahedrons can support subject-oriented retrieval. For example, by using the Subject element in ASSOCIATION_of_TETRAHEDRONS, all data related to a subject can be retrieved, and from any $V_u$ in the set, data that is related to $V_u$ and has the same subject as $V_u$ can be found.

Tetrahedral Data Model Implementation

Figure 2:
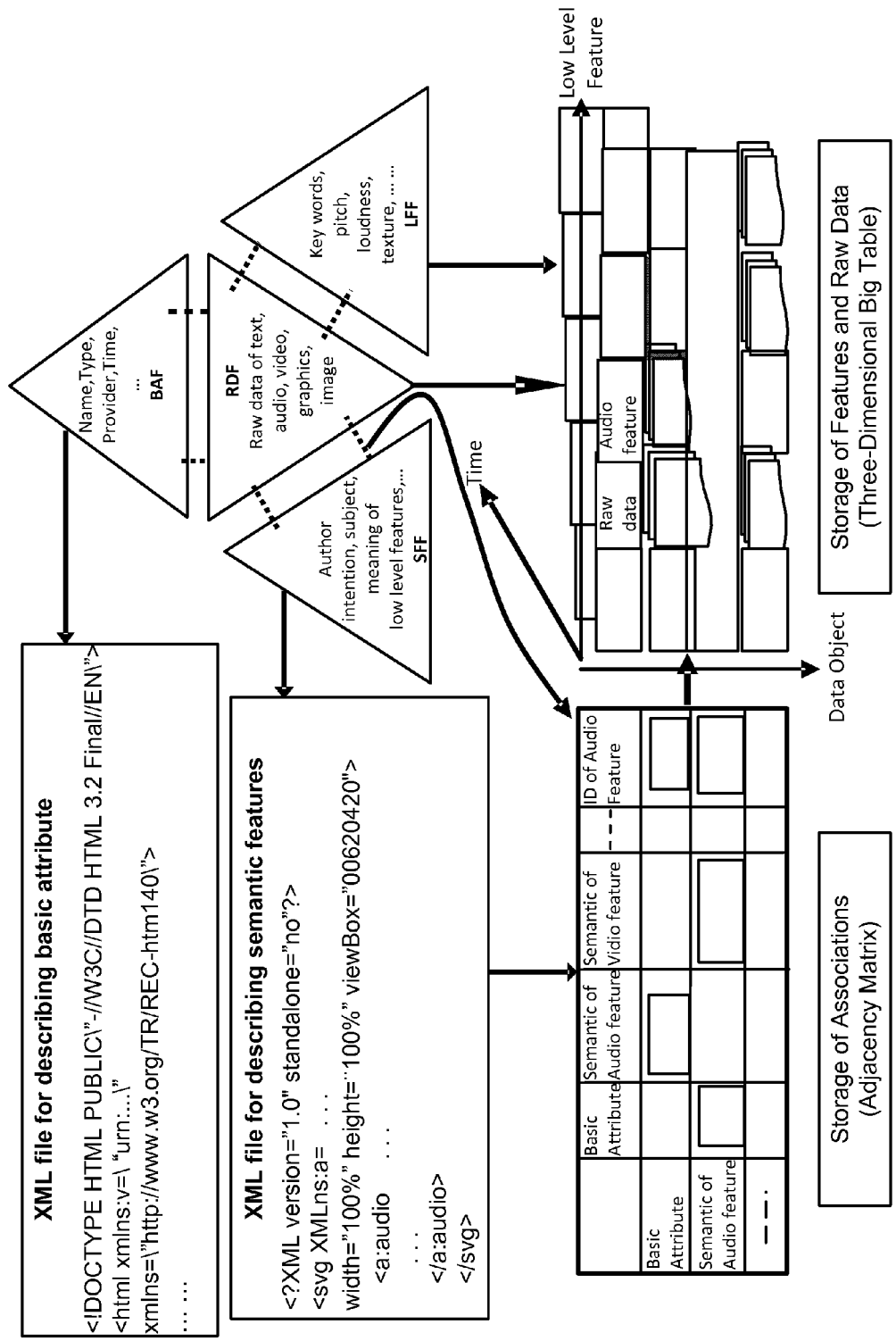
FIG. 2 is a high-level block diagram illustrating an implementation of the tetrahedral data model shown in FIG. 1 according to one embodiment of the present disclosure.

FIG. 2 illustrates an implementation of the tetrahedral data model in an Unstructured data Base Management System (UDBMS), according to one embodiment of the present description.

In this example implementation, the vertex that is used to uniquely identify a tetrahedron can be generated by the UDBMS. The basic attributes and the semantic features can be described using various structural languages. In one example, the Extensible Markup Language (XML), because of its self-descriptive feature, powerful linking ability, and abilities to describe complex semantics and structures, is used to represent and store basic attributes and semantic features.

The low-level features and/or the raw data can be organized and stored using a three-dimensional ("3D") big table. As shown in FIG. 2, the three dimensions of the 3D big table represent: data object, low-level feature (or raw data), and time, respectively. Each row in the 3D big table represents a data object, and each column represents a low-level feature (or raw data). Moreover, different data objects may have different low-level feature sets. The value of a low-level feature can be any basic data type values (e.g., a number, a string) or a feature vector. The low-level feature values/raw data of a data object may change with time, and each revision of the low-level features/raw data forms a new data version. These sequences of versions can be stored by using the third dimension of the 3D big table, time. Unlike conventional 2D tables in a relational database, the three dimensions of the 3D big table are all extendable at runtime, and thus the 3D big table is flexible for storing unstructured data whose structures and forms are manifold. In addition, the 3D big table allows for the uniform storage of raw data and its low-level features.

The associations between objects on different facets are stored in an adjacency matrix, which refers to the raw data and low-level features stored in the 3D big table and the basic attributes and the semantic features stored in XML file(s). In one embodiment, to achieve data independence, the tetrahedral data model is implemented in the logical schema in the three schema architecture of database management systems. See Codd E. F., "A Relational Model of Data for Large Shared Data Banks", Communication of ACM, Vol. 13, No. 6, June 1970, the content of which is incorporated by reference in its entirety.

Architecture of Tetrahedral Data Model Annotation System

Figure 3:
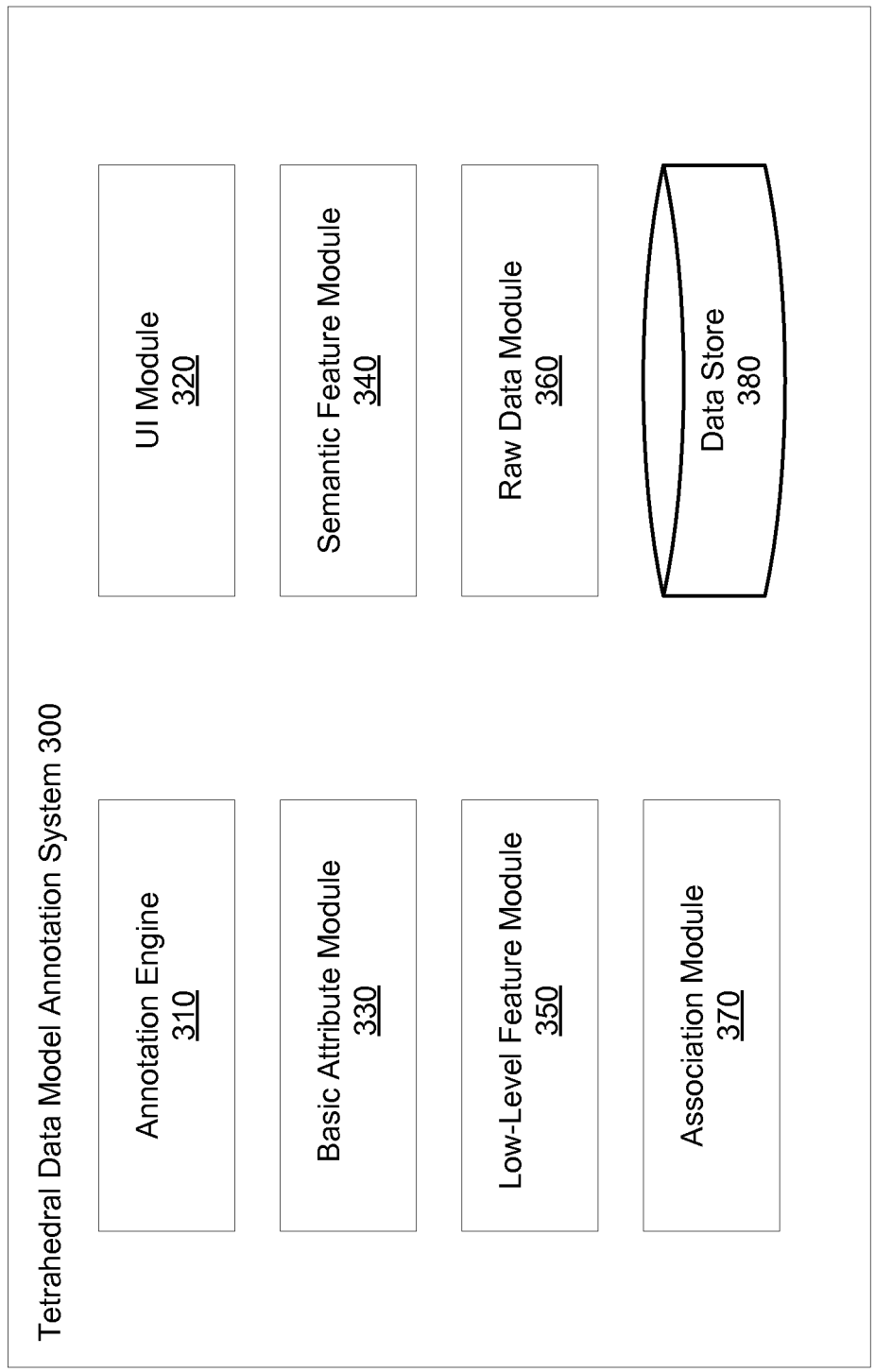
FIG. 3 is a high-level block diagram illustrating modules within a tetrahedral data model annotation system according to one embodiment of the present disclosure.

FIG. 3 is a diagram illustrating modules within a tetrahedral data model annotation system (also called a "tetrahedral annotation system" or a "tetrahedral annotation module") 300 for representing unstructured data using the tetrahedral data model, according to one embodiment of the present description. Some embodiments of the system 300 have different and/or other modules than the ones described herein. Similarly, the functions can be distributed among the modules in accordance with other embodiments in a different manner than is described here. As illustrated, the system 300 includes an annotation engine 310, a user interface (UI) module 320, a basic attribute module 330, a semantic feature module 340, a low-level feature module 350, a raw data module 360, an association module 370, and a data storage 380.

The annotation engine 310 creates a tetrahedron for a piece of un-annotated unstructured data. In addition, #310 works with the other modules within the tetrahedral annotation system 300 to populate the tetrahedron, and stores the resulting tetrahedron in the data storage 380.

The UI module 320 provides a UI for rendering (e.g., displaying) information related to a piece of unstructured data (e.g., raw data files, basic attributes, semantic features, low-level features), and/or receiving user inputs. For example, a user can provide basic attributes and semantic features for a tetrahedron (e.g., based on the displayed raw data file) or edit existing attributes/features through the UI module 320.

The basic attribute module 330 populates the basic attribute facet of a tetrahedron with basic attributes created based on information received from the UI module 320 or other sources (e.g., a device or application connected with the tetrahedral annotation system 300). Similarly, the semantic feature module 340 populates the semantic feature facet of the tetrahedron with semantic features created based on the received information (e.g., from the UI module 320 or other sources). In one embodiment, the basic attribute module 330 and the semantic feature module 340 describe the basic attributes (e.g., 4-tuple in Formula 1) and the semantic features (e.g., 6-tuple in Formula 2) using XML and stores the resulting XML file(s) in the data storage 380.

The low-level feature module 350 populates the low-level feature facet of the tetrahedron with low-level features created based on the received information. The raw data module 360 populates the raw data facet of the tetrahedron using the raw data files of the underlying unstructured data. In one embodiment, the low-level feature module 350 and the raw data module 360 store the low-level features (e.g., 6-tuples in Formula 3) and the raw data files (e.g., 4-tuples in Formula 4) in a 3D big table in the data storage 380.

The association module 370 creates associations among elements (e.g., basic attributes, semantic features, low-level features, raw data files) within a tetrahedron based on their inherent relationships and relationships indicated in the received information. In one embodiment, the association module 370 stores the associations (e.g., 3-tuples in Formula 11) in an adjacency matrix.

The data storage 380 stores the tetrahedrons created by the tetrahedral annotation system 300. In one embodiment, the data storage 380 includes a UDBMS, and is configured to generate a vertex for each tetrahedron to uniquely identify the tetrahedron in the UDBMS.

Computer Architecture

Figure 4:
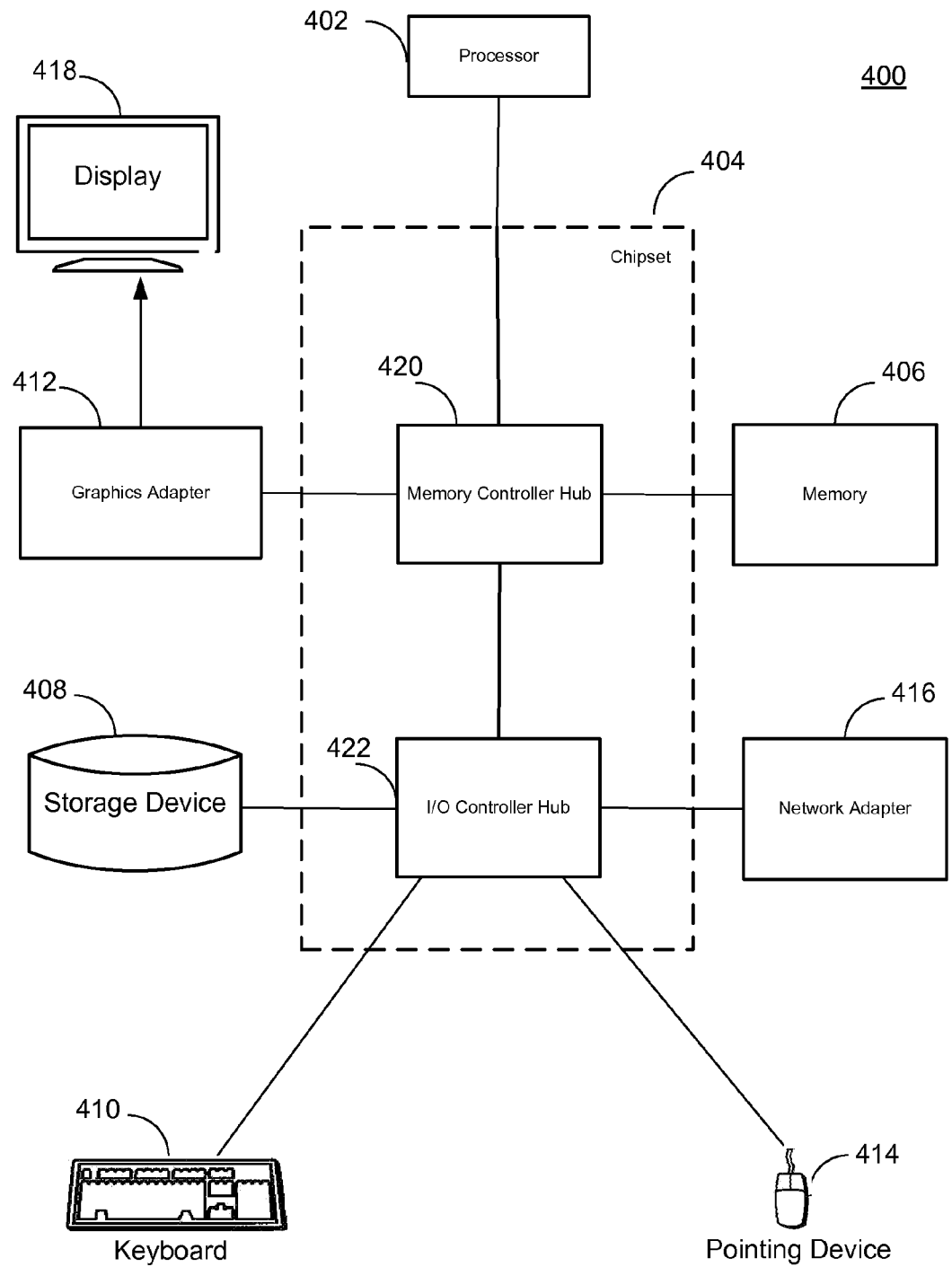
FIG. 4 is a high-level block diagram illustrating an example of a computer for implementing the tetrahedral data model shown in FIG. 3 according to one embodiment of the present disclosure.

The modules shown in FIG. 3 are implemented using one or more computers. FIG. 4 is a high-level block diagram illustrating an example computer 400. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer system 400. The graphics adapter 412 displays images and other information on the display 418. The network adapter 416 couples the computer system 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the modules of FIG. 3 can vary depending upon the embodiment and the processing power required by the entity, and can lack some of the components described above, such as keyboards 210, graphics adapters 212, and displays 218.

Example Applications of Tetrahedral Annotation System

The tetrahedral annotation system 300 can be integrated into a variety of systems for representing unstructured data accessible to the systems. Examples of such systems are illustrated in FIGS. 5A-E and described below.

Figure 5A:
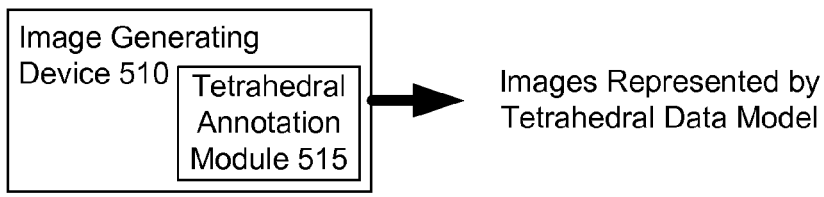
FIGS. 5A-E are high-level block diagrams illustrating example systems integrating the tetrahedral data model shown in FIG. 3 according to one embodiment of the present disclosure.

FIG. 5A is a high-level block diagram illustrating an image generating device 510. Examples of the image generating device 510 include digital cameras and digital image generating devices (e.g., digital scanners). As shown, the image generating device 510 includes a tetrahedral annotation module 515 for automatically generating tetrahedrons for digital images generated by the image generating device 510. The tetrahedral annotation module 515 optionally populates the tetrahedrons using information provided by the image generating device 510, such as image creation time (basic attribute), and image file (raw data). Users of the image generating device 510 can provide additional textual descriptions (basic attributes or semantic features) into the tetrahedrons through the tetrahedral annotation module 515. Image analysis applications can generate and add low-level features such as physical/optical characteristics of the images into the tetrahedrons. The resulting tetrahedrons can then be stored in a UDBMS, which in turn will assign identifiers (e.g., vertexes of the tetrahedrons) and avail the images for advanced query operations.

Figure 5B:
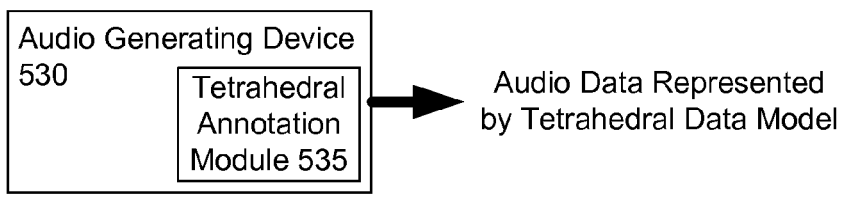

FIG. 5B is a high-level block diagram illustrating an audio generating device 530. Examples of the audio generating device 530 include digital audio recorders and audio editing devices/applications (e.g., audio synchronizers). As shown, the audio generating device 530 includes a tetrahedral annotation module 535 for automatically generating tetrahedrons for audio data generated by the audio generating device 530. The tetrahedral annotation module 535 optionally populates the tetrahedrons using information provided by the audio generating device 530, such as audio creation time (basic attribute), and audio file (raw data). Users of the audio generating device can provide additional textual descriptions into the tetrahedrons through the tetrahedral annotation module 535. Audio analysis applications can generate and add low-level features such as physical/acoustic characteristics of the audio data into the tetrahedrons. The resulting tetrahedrons can then be stored in a UDBMS, which in turn will assign identifiers and avail the audio data for advanced query operations.

Figure 5C:
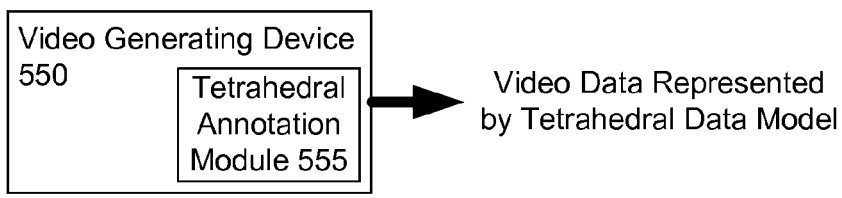

FIG. 5C is a high-level block diagram illustrating a video generating device 550. Examples of the video generating device 550 include digital video recorder and video editing devices/applications. As shown, the video generating device 550 includes a tetrahedral annotation module 555 for automatically generating tetrahedrons for video data generated by the video generating device 550. The tetrahedral annotation module 555 optionally populates the tetrahedrons using information provided by the video generating device 550, such as video creation time (basic attribute), and video file (raw data). Users of the video generating device 550 can provide additional textual descriptions into the tetrahedrons through the tetrahedral annotation module 555. Video analysis applications can generate and add low-level features such as physical/optical characteristics of the video data into the tetrahedrons. The resulting tetrahedrons can then be stored in a UDBMS, which in turn will assign identifiers and avail the video data for advanced query operations.

Figure 5D:
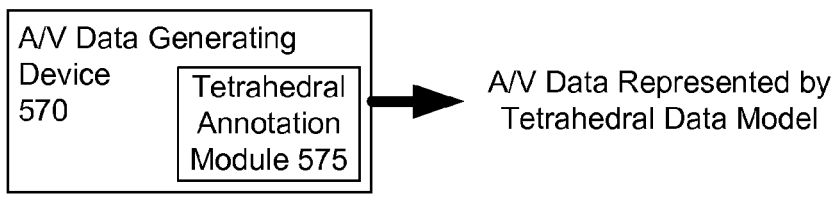

FIG. 5D is a high-level block diagram illustrating an audio/video ("A/V") generating device 570. Examples of the A/V generating device 570 include digital camcorders and A/V editing devices/applications. As shown, the A/V generating device 570 includes a tetrahedral annotation module 575 for automatically generating tetrahedrons for A/V data generated by the A/V generating device 570. The tetrahedral annotation module 575 optionally populates the tetrahedrons using information provided by the A/V generating device 570, such as creation time (basic attribute), and video file (raw data). Users of the A/V generating device 570 can provide additional textual descriptions into the tetrahedrons through the tetrahedral annotation module 575. A/V analysis applications can generate and add low-level features such as physical/acoustic/optical characteristics of the A/V data into the tetrahedrons. The resulting tetrahedrons can then be stored in a UDBMS, which in turn will assign identifiers and avail the A/V data for advanced query operations.

Figure 5E:
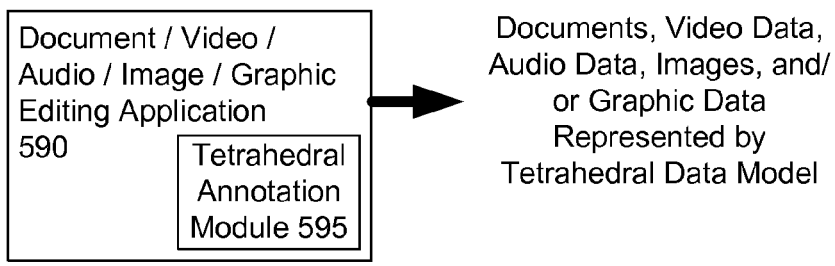

FIG. 5E is a high-level block diagram illustrating a document/video/audio/image/graphic editing application (also called an "editing application") 590. As shown, the editing application 590 includes a tetrahedral annotation module 595 for creating and/or editing tetrahedral data models for documents, video data, audio data, images, and/or graphic data containing unstructured data. The tetrahedral annotation module 595 can provide a wiki function for managing and tracking edits made to the textual descriptions (e.g., basic attributes and semantic features) of the underlying unstructured data. The resulting tetrahedrons can then be stored (or updated) in a UDBMS, which in turn will assign identifiers (if not already) and avail the documents, video data, audio data, images, and/or graphic data for advanced query operations.

The tetrahedral annotation modules 515, 535, 555, 575, and 595 include some or all modules of the tetrahedral annotation system 300 as described above and can be implemented as software, firmware, or hardware. The tetrahedral annotation modules may also include additional modules such as a voice recognition module (not shown) enabling the operator to provide oral annotation while generating/editing unstructured data. The voice recognition module converts the oral annotation into text, and adds into the corresponding tetrahedrons (e.g., as semantic features).

Unstructured Data Query Language for Tetrahedral Data Model

An unstructured data query language (UDQL) is developed to provide comprehensive query operations for unstructured data represented by the tetrahedral data model in an UDBMS. Example query operations for unstructured data supported by the UDQL include: basic data retrieval, associated retrieval, and intelligent retrieval. The basic data retrieval refers to queries on a single facet of the tetrahedron (e.g., the basic attribute facet, semantic feature facet, low-level feature facet). These queries utilize keyword searching or low-level feature matching (e.g., sample-based feature matching). Associated retrieval refers to queries that use two or three facets of a tetrahedron (e.g., the basic attribute facet, semantic feature facet, low-level feature facet) and subject-oriented queries among multiple tetrahedrons based on their semantic feature facets (or other facets). Intelligent retrieval refers to queries that implement subject-oriented multidimensional data analysis, data clustering and classification according to specified conditions. The UDQL also supports more complex queries by supporting a nested structure based on these three different kinds of query operations.

The query statement in UDQL supports all three kinds of query operations mentioned above. Because in one example the basic attributes and the semantic features of the tetrahedral data model are described using XML, UDQL is defined by extending the query language of XML (e.g., XQuery). A query statement in XQuery is described by a FLWOR expression. FLWOR is made up of initial letters of For, Let, Where, Order by, and Return. The FLWOR expression defines the basic structure of a query, and it can support multiple query conditions which provide flexible approaches to data reconstruction. An example UDQL query statement Q_UD has the following FLWOR structure:

Q_UD=for <object_list>
   let <var_def_list>
   where <condition>
   order by <order_spec_list>
   return <return_list>.

In the above statement the for clause creates a loop, and local variables are defined in the let clause. For each object in the <object_list> of the for loop, the <condition> in the where clause will be checked. If the result is true, then the object will be outputted by invoking the return clause. Each of the parameters in the clauses of Q_UD are described in further detail below.

The parameter <object_list> denotes the data objects to be included in the query. As illustrated in the following equation, the elements in this set can be objects on a single facet of the tetrahedron, the result of another Q_UD query, or the union, difference, intersection, or Cartesian product of results of two (or more) Q_UD queries:

<object_list>=BA_FACET
   |SF_FACET
   |LF_FACET
   |Q_UD
   |Union(Q_UD1,Q_UD2)
   |Difference(Q_UD1,Q_UD2)
   |Intersection(Q_UD1,Q_UD2)
   |CartesianProduct(Q_UD1, Q_UD2).

The parameter <var_def_list> denotes the list of local variables to be used in the Q_UD, and can be described using the following equation:

<var_def_list>=<VarName>:=<expression>
   (,<VarName>:=<expression>)*.

The parameter <condition> denotes the query condition, and is defined as an expression. As shown in the following equations, <condition> can be simple or complex. A complex condition is constructed by using logical operators, such as and, or, not. Simple conditions are of two types, precise comparisons and imprecise comparisons.

<condition>=<simple_condition>|<complex_condition>,
<simple_condition>=<precise_comparison>|<imprecise_comparison>,
<complex_condition>=(<condition>)(and|or|not)(<condition>), where <precise_comparison> defines precise comparison conditions that are based on routine comparison operations, and <imprecise_comparison> defines imprecise comparison conditions that are used for low-level feature query. The operands for precise comparison of keywords, strings, digital values in basic attributes or semantic attributes are =, <, <=, >, >= and !=. The queries on basic attributes and semantic attributes can be constructed by using <precise_comparison> conditions. In order to construct an imprecise comparison expression, it may be necessary to extend XQuery by adding the operator match and low-level feature comparison function similarity_degree( ). The operator match is defined using the following expression:

$lf\_v1$ match $lf\_v2$,(degree), which means feature lf_v1 is compared with feature lf_v2, and the similarity degree of the two features should be no less than degree. The result type of a match expression is Boolean. Feature comparison function similarity_degree( ) is defined as:

similarity_degree($lf\_v1,lf\_v2$): LF_FACET×LF_FACET→[0,1], where the two parameters of the function similarity_degree (lf_v1,lf_v2) are compared, and the return value is a real number in the interval of [0,1].

The parameter <order_spec_list> is defined using the following equation:

<order_spec_list>=<expression><orderModifier>, where <expression> specifies how the query result is sorted, and <orderModifier> specifies whether the order is ascending or descending.

The <return_list> parameter is an expression that specifies the return contents of a selected data object. Intelligent operators such as data analyzing operators, data clustering and data classification operators can be defined and used in the <return_list> expression to conduct intelligent data processing on specified data set. One family of such operators is the multidimensional data analyzing operator family, which includes data slicing and dicing according to a specific dimension or subject, and supports executing further statistical analysis on the sliced and diced data. The data slicing operator, the data dicing operator, and the statistical analysis are defined using the following expressions:

Data slicing operator: sliced on $(d_1, d_2)$, where $d_i$ (i=1,2) represents dimensions, Data dicing operator: diced on $(d_1, d_2, d_3)$, where $d_i$ (i=1,2,3) represent dimensions, and Statistical analysis: statistical_analysis with <stat_model>, where <stat_model> represents a certain kind of statistical model.

Another family of operators that can be used in the <return_list> parameter is the data mining operators such as the data clustering operator and the data classification operator defined using the following expressions:

Data clustering: cluster by <expression>, and

Data classification: classify on <expression>, where <expression> specifies the rules for data clustering and classification, and can be a FLWOR expression, Boolean expression, conditional expression, switch expression or a compound of these expressions.

Through the Q_UD statement, operations on unstructured data, including basic data retrieval, associated retrieval and intelligent retrieval, can be performed. For basic data retrieval, the facet of a tetrahedron that is related to the query is specified in <object_list>, and the query conditions can be defined in <condition>. Associated retrieval among multiple facets of a tetrahedron can be achieved by constructing a nested query statement. For example, the query statement could put a Q_UD of a facet in the <object_list> or <condition> of another Q_UD which is to be queried on other facets. Q_UD for achieving subject-oriented associated retrieval among multiple tetrahedrons can be constructed by using Union(Q_UD1, Q_UD2),Difference(Q_UD1, Q_UD2) or Intersection(Q_UD1, Q_UD2) in <object_list>, and by using the same subject related conditions in these parameter Q_UDs. By using intelligent query operators in the <expression> of <return_list>, intelligent retrieval on specific scope of data can be carried out.

Overview of Methodology

Figure 6:
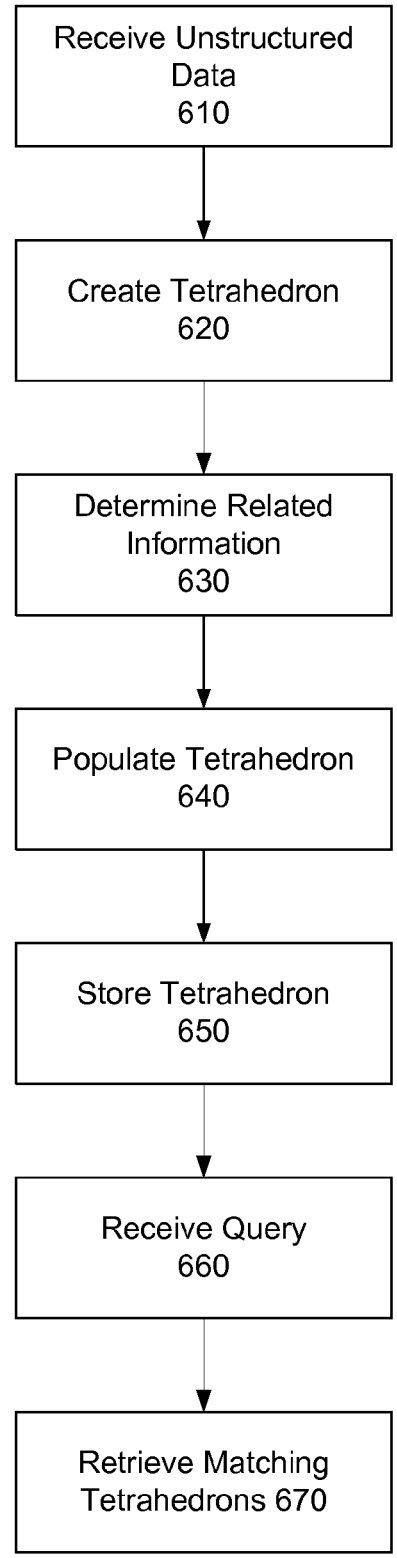
FIG. 6 is a flow diagram illustrating a process for describing unstructured data using the tetrahedral data model and conducting searches using the tetrahedral data model according to one embodiment of the present disclosure.

FIG. 6 is a flow diagram illustrating a process 600 for describing unstructured data using the tetrahedral data model and conducting searches using the tetrahedral data model, according to one embodiment. Other embodiments can perform the steps of the process 600 in different orders. Moreover, other embodiments can include different and/or additional steps than the ones described herein.

Initially, a tetrahedral annotation module receives 610 a piece of unstructured data. For example, the tetrahedral annotation module maybe embedded in a digital camcorder, and receives video clips captured by the digital camcorder.

The tetrahedral annotation module creates 620 a tetrahedron to represent the unstructured data, determines 630 information about various aspects of the unstructured data (basic attributes, semantic features, low-level features, and/or raw data) along with their inter-relationships, and populates 640 the tetrahedron using the determined information. Continuing with the above example, the tetrahedral annotation module creates 620 a tetrahedron for the video clip, and determines 630 basic attributes, semantic features, low-level features, and/or raw data files of the video clip, and relationships among the attributes, features and raw data files. Examples of the basic attributes include data type (e.g., video), title, and creator. Examples of the semantic features include genre, description, subject, and length. Examples of the low-level features include key frames, texture, and color histogram. The attributes and features can be provided by the digital camcorder or a user (e.g., through voice recognition). The tetrahedral annotation module populates 640 the tetrahedron with the determined basic attributes, semantic features, low-level features, and raw data files (collectively called elements), and creates associations among the populated elements based on the determined relationships.

The tetrahedral annotation module stores 650 the tetrahedron in an UDBMS. The UDBMS generates an identifier that uniquely identifies the tetrahedron in the UDBMS, stores the basic attributes and the semantic features in one or more XML files, stores the low-level features and the raw data files (or their representative tuples) in a 3D big table, and stores the associations in an adjacency matrix.

The UDBMS receives 660 a user query in UDQL, and retrieves 670 tetrahedrons representing unstructured data satisfying conditions in the user query. The user query includes a FLWOR structure that supports basic data retrieval, associated retrieval, and intelligent retrieval.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative implementations, systems, and processes describing unstructured data using the tetrahedral data model and/or conducting searches using the tetrahedral data model. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. An unstructured data processing apparatus, comprising:
   a processor; and
   a non-transitory computer-readable storage medium for storing a tetrahedral data model in the non-transitory computer-readable storage medium; and
   a tetrahedral annotation module for representing unstructured data generated by the apparatus using the tetrahedral data model, the tetrahedral annotation module comprising:
      an annotation module for automatically creating an instance of the tetrahedral data model for a piece of unstructured data generated by the apparatus, the tetrahedral data model having a vertex, four facets, and lines between the facets, the vertex including an identifier associated with the tetrahedral data model, the four facets of the tetrahedral data model including a basic attribute set, a semantic feature set, a low-level feature set, and a raw data set, and the lines between the facets designating associations among the basic attribute set, the semantic feature set, the low-level feature set, and the raw data set;
      a raw data module for populating the raw data set with one or more raw data files of the piece of unstructured data;
      a low-level feature module for populating the low-level feature set with one or more properties that are specific to a type of the piece of unstructured data, the low-level feature set including one or more of color, texture, shape for an image, audio frequency for audio, or a key frame for a video;
      a semantic feature module for populating the semantic feature set with one or more semantic properties of the piece of unstructured data, the semantic feature set including one or more of author intention, subject, descriptions of content of the unstructured data, descriptions of objects of the unstructured data, meaning of one or more of the low-level features, annotations in keywords, free text styles, or concepts of data objects described using ontology;
      a basic attribute module for populating the basic attribute set with one or more attributes that are universal to unstructured data, the basic attribute set including one or more of a name, type, author, or time of creation; and
      an association module for populating the tetrahedral data model with the lines designating associations among the basic attribute set, the semantic feature set, the low-level feature set, and the raw data set.

2. The apparatus of claim 1, wherein the apparatus comprises a digital camera, and the piece of unstructured data comprises an image.

3. The apparatus of claim 1, wherein the apparatus comprises a digital audio recorder, and the piece of unstructured data comprises audio data.

4. The apparatus of claim 1, wherein the apparatus comprises a digital video recorder, and the piece of unstructured data comprises video data.

5. The apparatus of claim 1, wherein the apparatus comprises an audio/video (A/V) data generating device, and the piece of unstructured data comprises audio data and video data.

6. The apparatus of claim 1, wherein the apparatus comprises an editing application for editing one or more of a document, video, audio, image, or graphics, and the piece of unstructured data comprises one or more of the following: an unstructured document, video data, audio data, image data, and graphic data.

7. The apparatus of claim 1, wherein the non-transitory computer-readable storage medium comprises an Unstructured data Base Management System (UDBMS), the UDBMS configured to assign the identifier to the populated tetrahedral data model.

8. The apparatus of claim 7, wherein the UDBMS stores in the raw data set and the low level feature set in an expandable three-dimensional (3D) big table.

9. The apparatus of claim 7, wherein the UDBMS stores the associations in an adjacency matrix.

10. The apparatus of claim 7, wherein the UDBMS stores the basic attribute set and the semantic feature set in one or more Extensible Markup Language (XML) files.

11. A computer-implemented method for processing unstructured data, comprising:
    creating an instance of a tetrahedral data model for representing a piece of unstructured data, the tetrahedral data model comprising a vertex, four facets, and lines between the facets, the vertex including an identifier associated with the tetrahedral data model, the four facets of the tetrahedral data model including a basic attribute set, a semantic feature set, a low-level feature set, and a raw data set, and the lines between the facets designating associations among the basic attribute set, the semantic feature set, the low-level feature set, and the raw data set;
    populating the tetrahedral data model using information related to the piece of unstructured data, comprising one or more of the following:
       populating the raw data set with one or more raw data files of the piece of unstructured data,
       populating the low-level feature set with one or more properties that are specific to a type of the piece of unstructured data, the low-level feature set including one or more of color, texture, shape for an image, audio frequency for audio, or a key frame for a video,
       populating the semantic feature set with one or more semantic properties of the piece of unstructured data, the semantic feature set including one or more of author intention, subject, descriptions of content of the unstructured data, descriptions of objects of the unstructured data, meaning of one or more of the low-level features, annotations in keywords, free text styles, or concepts of data objects described using ontology, populating the basic attribute set with one or more attributes that are universal to unstructured data, the basic attribute set including one or more of a name, type, author, or time of creation, and populating the tetrahedral data model with the lines designating associations among the basic attribute set, the semantic feature set, the low-level feature set, and the raw data set; and storing the populated tetrahedral data model in a non-transitory computer-readable storage medium.

12. The method of claim 11, wherein storing the populated tetrahedral data model further comprises:

assigning the identifier to the tetrahedral data model; and storing the tetrahedral data model along with the identifier in an Unstructured data Base Management System (UDBMS).

13. The method of claim 12, wherein the storing step further comprises:

storing the raw data set and the low level feature set in an expandable three-dimensional (3D) big table in the UDBMS.

14. The method of claim 12, wherein the storing step further comprises:

storing the associations in an adjacency matrix in the UDBMS.

15. The method of claim 12, wherein the basic attribute set and the semantic feature set are stored in one or more Extensible Markup Language (XML) files.

16. A non-transitory computer-readable storage medium storing executable computer program instructions for processing unstructured data, the computer program instructions comprising instructions for:

creating an instance of a tetrahedral data model for representing a piece of unstructured data, the tetrahedral data model comprising a vertex, four facets, and lines between the facets, the vertex including an identifier associated with the tetrahedral data model, the four facets of the tetrahedral data model including a basic attribute set, a semantic feature set, a low-level feature set, and a raw data set, and the lines between the facets designating associations among the basic attribute set, the semantic feature set, the low-level feature set, and the raw data set;

populating the tetrahedral data model using information related to the piece of unstructured data, comprising one or more of the following:

populating the raw data set with one or more raw data files of the piece of unstructured data, populating the low-level feature set with one or more properties that are specific to a type of the piece of unstructured data, the low-level feature set including one or more of color, texture, shape for an image, audio frequency for audio, or a key frame for a video, populating the semantic feature set with one or more semantic properties of the piece of unstructured data, the semantic feature set including one or more of author intention, subject, descriptions of content of the unstructured data, descriptions of objects of the unstructured data, meaning of one or more of the low-level features, annotations in keywords, free text styles, or concepts of data objects described using ontology, populating the basic attribute set with one or more attributes that are universal to unstructured data, the basic attribute set including one or more of a name, type, author, or time of creation, and populating the tetrahedral data model with the lines designating associations among the basic attribute set, the semantic feature set, the low-level feature set, and the raw data set; and storing the populated tetrahedral data model in a non-transitory computer-readable storage medium.

17. The storage medium of claim 16, wherein storing the populated tetrahedral data model further comprises:

assigning the identifier to the tetrahedral data model; and storing the tetrahedral data model along with the identifier in an Unstructured data Base Management System (UDBMS).

18. The storage medium of claim 17, wherein the storing step further comprises:

storing the raw data set and the low level feature set in an expandable three-dimensional (3D) big table in the UDBMS.

19. The storage medium of claim 17, wherein the storing step further comprises:

storing the associations in an adjacency matrix in the UDBMS.

20. The storage medium of claim 17, wherein the basic attribute set and the semantic feature set are stored in one or more Extensible Markup Language (XML) files.

* * * * *

UNITED STATES PATENT AND TRADEMARK OFFICE
CERTIFICATE OF CORRECTION

PATENT NO. : 8,489,650 B2
APPLICATION NO. : 12/984967
DATED : July 16, 2013
INVENTOR(S) : Xiaogeng Li et al.

Page 1 of 1

It is certified that error appears in the above-identified patent and that said Letters Patent is hereby corrected as shown below:

In the Claims

Claim 8 at column 14, line 30, after "stores," delete "in".

Signed and Sealed this
Fourth Day of February, 2014

Michelle K. Lee
*Deputy Director of the United States Patent and Trademark Office*